United States Patent
McCartney

(10) Patent No.: US 7,104,451 B1
(45) Date of Patent: Sep. 12, 2006

(54) SYSTEM AND METHOD OF BAR CODE ERROR DETECTION IN LARGE VOLUME MAILING

(76) Inventor: James I. McCartney, 3450 S. Ocean Blvd., #702, Highland Beach, FL (US) 33487

( * ) Notice: Subject to any disclaimer, the term of this patent is extended or adjusted under 35 U.S.C. 154(b) by 0 days.

(21) Appl. No.: 10/604,215

(22) Filed: Jul. 1, 2003

(51) Int. Cl.
  *G06K 7/10* (2006.01)
(52) U.S. Cl. .................. 235/462.01; 235/462.02; 235/462.22
(58) Field of Classification Search ........... 235/462.01, 235/462.06, 462.02, 462.22, 462.24, 462.34, 235/494
See application file for complete search history.

(56) References Cited

U.S. PATENT DOCUMENTS

| | | | | |
|---|---|---|---|---|
| 5,452,203 A | * | 9/1995 | Moore | 707/200 |
| 5,758,574 A | * | 6/1998 | Bernardo et al. | 101/2 |
| 5,819,239 A | * | 10/1998 | Berson et al. | 705/403 |
| 5,862,243 A | * | 1/1999 | Baker et al. | 382/101 |
| 6,002,095 A | * | 12/1999 | Bodie et al. | 209/584 |
| 6,158,659 A | * | 12/2000 | Dickson et al. | 235/462.01 |
| 6,269,171 B1 | * | 7/2001 | Gozzo et al. | 382/101 |
| 6,370,521 B1 | * | 4/2002 | Pigos et al. | 707/2 |
| 6,415,983 B1 | * | 7/2002 | Ulvr et al. | 235/487 |
| 6,462,880 B1 | * | 10/2002 | Ohkawa et al. | 359/629 |
| 6,557,755 B1 | * | 5/2003 | Pickering et al. | 235/376 |

* cited by examiner

*Primary Examiner*—Steven S. Paik
(74) *Attorney, Agent, or Firm*—Malin, Haley & DiMaggio, P.A.

(57) ABSTRACT

A system for bar code error detection in large volume mailings against a print run which prints the bar code on a mail piece. The system checks the print quality of the bar code and compares it with pre-selected standards. The bar code is then decoded, and compared to a database in the computer to confirm that the bar code is valid. The system then prints out a report to certify the sampling, comparisons and error rate for all verification tests. The report may be used by the United States Post Office to expedite bulk mailing by a direct mailer.

17 Claims, 8 Drawing Sheets

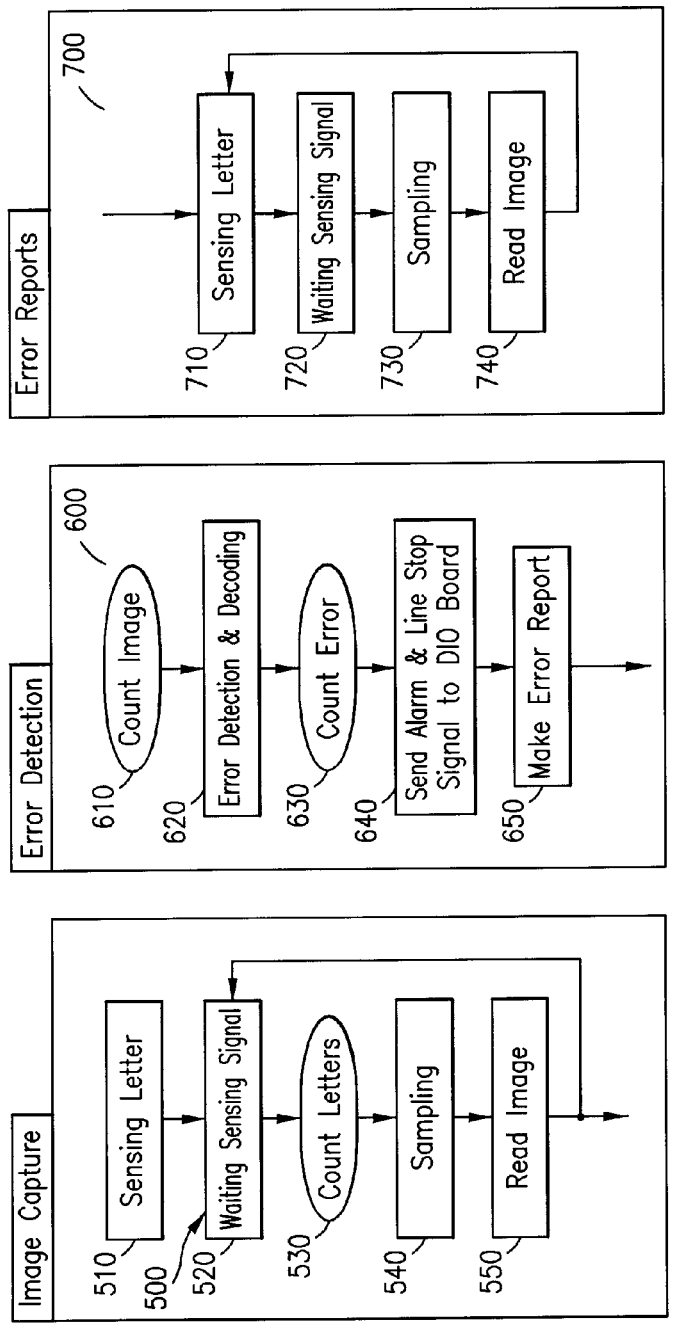

SYSTEM AND METHOD OF BAR CODE ERROR DETECTION IN LARGE VOLUME MAILING

BACKGROUND OF INVENTION

1. Field of the Invention

This invention relates generally to the field of bar code and address error detection in large volume (bulk) mailing to improve quality control. Specifically, this invention relates to a system and method that allows a mass mailer to give a report to the U.S. Post Office that the bulk mailing has passed a certain specification.

2. Description of Related Art

The U.S. Post Office handles the largest volume of mail in the world. A large portion of the mail being handled in the United States results from high volume mailings and bulk mailings by companies who use direct mailing in their businesses on a daily basis.

In general, about 10 percent of the incoming mails of the U.S. Post Office have printing errors on the post net bar code. In terms of reliablility, the U.S. Post Office requires a 90 percent printing accuracy and returns them to direct mailing companies with penalties unless they meet the criteria. So the burden of direct mail companies grows heavier as the volume of mail increases.

The MERLIN Prints Mail Evaluation Readability Lookup Instrument (system of the United States Post Office) operates air detection in decoding software for samples of total mailings from direct mailing companies and report the MERLIN Bar code Quality Report to the direct mailing company. The MERLIN Bar code Quality Report displays the bar code evaluation results using a set of error codes that are displayed to the post net bar code image and summarized at the bottom of the report.

Optical readers are currently used to read and decipher bar codes. Such scanners are primarily used to read and record only. They are not used in mail systems to evaluate the physical characteristics of a bar code nor to evaluate the accuracy of a bar code as it reflects the known data contained in the database as signified by the bar code.

Address data, such as name, address, city, state and zip code, is generated on mail pieces by many techniques. Among those techniques are inkjet and laser printing. Most developed countries have automated their postal systems by integrating one of many bar code formats to identify and route mail to its destination through their routing processes. These processes are largely based upon high-speed bar code readers and sorters. The efficiency of these machines and the nation's postal system as a whole is largely dependent upon the accuracy and readability of the bar code which has been printed on the mail.

To improve efficiency, the United States Postal Service (USPS) has introduced computer-based processes of several steps which are available to bulk mailers. In fact, the USPS offers a reduced postage rate for large volume mailers, so long as the mail pieces have the proper addresses and bar codes. The processes are designed to correct data such as street, city, state and zip code to ensure that they reflect a deliverable address in the USPS standard format. In addition, the USPS maintains and makes available an updated database which reflects the most recent occupant for each deliverable address and the most recent address for each person, company or entity receiving mail. Naturally, the accuracy of this database depends upon the mail recipient having provided updated information to the USPS. To obtain a certain postage discount from the USPS, each mailer must process his or her mailing data against the above referenced USPS databases to certify that the necessary steps to achieve the accuracy required for the discount have been taken.

Experience with the USPS has revealed the need for a system to confirm the accuracy and readability of mail delivered to the USPS by mailers before it is submitted to the USPS. The system captures the image of each piece of mail in a sample of each mailing and measures several factors. These factors include the physical readability of the information on the piece of mail, compliance of the bar code with applicable standards, and the accuracy of the address data.

The present U.S. Post Office error detection process is very slow. Therefore, it must rely on a small sample, such as approximately 1,000 pieces from a mailing of approximately 10,000 pieces. The sample size could be increased, but would slow down the process even further. Currently, on many occasions the process is totally ignored and the mail sent forward in order to clear a back-log of mail. Often times the slowness of the process causes gridlock at a USPS post office Business Mail Unit receiving dock.

The bulk or high volume mailer benefits substantially from the present invention because the mailer has an opportunity to know while the print job is being processed that the work conforms to USPS requirements. In addition, the savings in labor for the USPS are substantial. If a mailer fails to comply with USPS standards, and the mailer does not know until the USPS informs him or her, then the mailer has two alternatives: abandon the postal discount or reprint the information on the pieces of mail. For large mailings, such as those in the thousands or millions, the financial consequences for failure are enormous.

The true purpose of the present invention is to not really detect defects or errors in specific bulk mailings. The system and method allow a mass large volume mailer to give a report to the U.S. Post Office which certifies the fact that the mailing has passed a certain AQL level according to the appropriate military specification or mill spec. This will allow direct mailers that deal with high volumes of mail to deliver to the Post Office large mailings that will not have to be verified by the Post Office but which would be acceptable to the Post Office without time consuming verification. At the same time, the direct mailer by using the present invention feel comfortable that the error rates in the mailers are greatly reduced because of the present invention.

SUMMARY OF INVENTION

A bulk mailing error detection system that is used to provide control for large volumes of mailings that use bar codes. Basically, the system reads the bar code on the envelope, checks for print quality of the bar code compared to a U.S. Post Office standard, decodes the bar code and compares the decoded bar code to the database in the computer that is providing the addressing of the envelope. The system will print out a report that certifies the sampling comparison and error rate for all the functions of the system. In an alternate embodiment of the invention, the system will read the bar code and the address on the envelope, check for print quality compared to the U.S. Post Office standard, decode the bar code, compare the bar code to the database in the computer, and compare the address read to the printed address. Again, the system will print out a report to certify the sampling comparisons and error rates for all functions.

In yet another embodiment of the invention, the system will read the bar code and the address on the envelope, check for print quality compared to the U.S. Post Office standard, decode the bar code, compare the bar code to the database in the computer, compare the address to the printed address, and compare it to a U.S. Post Office database to ensure accuracy of the address and the ability to deliver to that address. Again, the system will printout a report to certify the sampling comparisons and error rate for all functions.

The function of the present invention is to optically scan the address data and bar codes on a mailing piece at the time that the information is being printed on the mailing piece to measure the compliance of the bar code geometry to the USPS specifications. It is also a function of the invention to measure the accuracy of the address data on the mailing piece that generates said bar codes.

In the event that the comparison of the data shows a mismatch or a lack of physical compliance, the testing will preferably result in suspending the print addressing operation until the error is corrected. In addition, the system will produce a computer-generated report indicating the number of pieces, addresses, the sample size, the accuracy of the sample size and the statistical reliability of the sample size. The computer error detections and sampling, together with the report, will make the bulk mailing acceptable to the USPS and reduce the probability of the mail being rejected. In fact the verification report could eliminate the rejection of the lot of mail and significantly reduce the losses in productivity that occur under the present method used by the USPS.

It is intended that the system is applied to a batched processing mode, or, if desirable, in real time as an online function during the print job. It is further intended that the sample size will be variable and controlled. Thus, the system will accommodate a single sampling as well as multiple samplings in order to provide the optimum accuracy assurance.

An integral element of this invention is the use of high speed scanning of the address and bar code on the mail piece in order to accommodate equipment that conventionally processes mail pieces at the rate of 10 to 50,000 pieces per hour. This high-speed reading may be accomplished in a number of ways. It may be accomplished utilizing a strobe light, thereby isolating a single document for reading and testing in the sample. It may also be operated in ambient light or it may be operated in the form of isolation such as a black box with a strobe light to facilitate the reading.

It would be desirable, but not mandatory, to achieve a pre-qualification acceptance of the product by the USPS. This acceptance may be made conditional upon proof of system accuracy so as to totally eliminate or significantly reduce the frequency of scrutiny of the USPS of offered mail pieces. If the above-referenced analytical report and certification accompany the mail, then both the USPS and the mailing company using the system reduce labor and delay. If the USPS will not enter into a cooperative program implementing this system, the invention is still useful because it represents significant economic advantage and productivity improvement for the mailing company by itself.

The solution to the above-stated problems in the prior art is the present invention: an integrated system which provides prior certification of mail quality before the mail is forwarded. A printed report of confirmation is provided. The system, with its certification report, allows major reduction or elimination in the sampling by the USPS. For example, the USPS may increase sampling size where a mailer has shown a history of non-compliance. On the other hand, if a mailer's accuracy proves reliable, then the mailer may be sampled less frequently. Thus, the USPS's labor in checking for compliance is reduced.

To accurately read the necessary image and data from the mail pieces passing under the reader, an image of a piece can be obtained by using a strobe light set to flash at a pre-determined frequency. The frequency can be varied to enable variation of the sample size taken for a pre-determined acceptable quality level. The image is read and the image data is recorded. The image data can be compared to the data which was transmitted from the computer to the print head. In addition, the physical characteristics of the bar code are compared to the USPS specifications to verify compliance as well as readability. The address data is also compared to the database data to establish address and residency compliance. This compliance may be checked against USPS standards using the mail's bar code only, the bar code with the standardized address, or the bar code, standardized address and the named recipient.

Each level of comparison defines a different level of sophistication which is reflected in the varying costs of different models. By increasing sample size, the quality of the print job can be more reliably be obtained. Any or all of these comparisons can be the basis for a printed report generated by the system for the mailer and accompanying the subject matter to the post office to certify the quality and compliance of the subject mail pieces.

If the system detects a non-compliant event, such as a non-readable or inaccurate bar code, or a non-compliant address, the system may trigger a visual or audible alarm. The system may also shut down or otherwise alert the operator of the situation. By shutting the process down, the system enables immediate correction of the non-compliant circumstances before an expensive and improper print job can be completed.

As discussed above, upon completion of the process and the generation of the verification report, the mail and the report together, with appropriate documents as necessary are delivered to the post office for processing or delivery. However, it is also contemplated that the post office itself use the verification system to increase its own efficiency.

It is an objection of this invention is to develop a system that will enable large mailers to sample their mailings more effectively, even performing a 100% test if necessary. Simultaneously, the system may verify the address, the accuracy of the bar code and the bar code's readability so as to prequalify the mail for its discount.

In accordance with these and other objects which will become apparent hereinafter, the instant invention will now be described with particular reference to the accompanying drawings.

BRIEF DESCRIPTION OF DRAWINGS

FIG. 6A is a flow chart of the image capturing mechanism of the invention.

FIG. 6B is a flow chart of the error detecting mechanism of the invention.

FIG. 6C is a flow chart of the error reporting mechanism of the invention.

DETAILED DESCRIPTION

Figure 1:
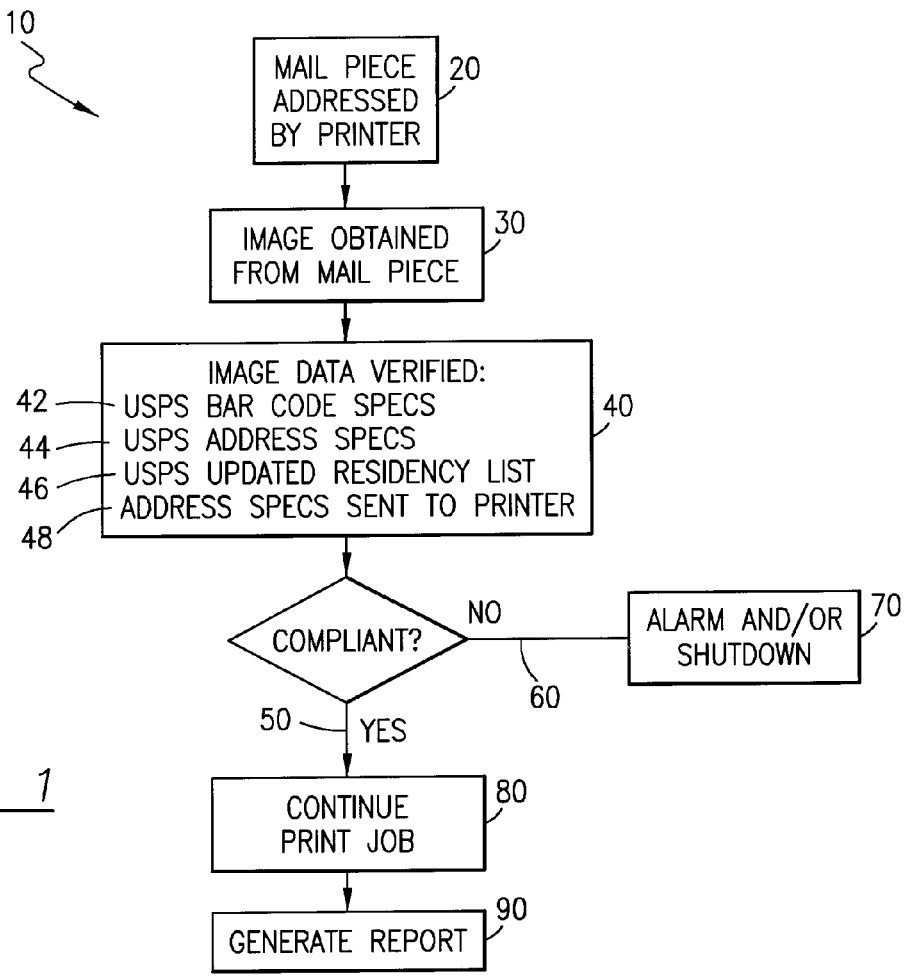
FIG. 1 is a basic flow chart of the steps to the method of the invention.
Figure 2:
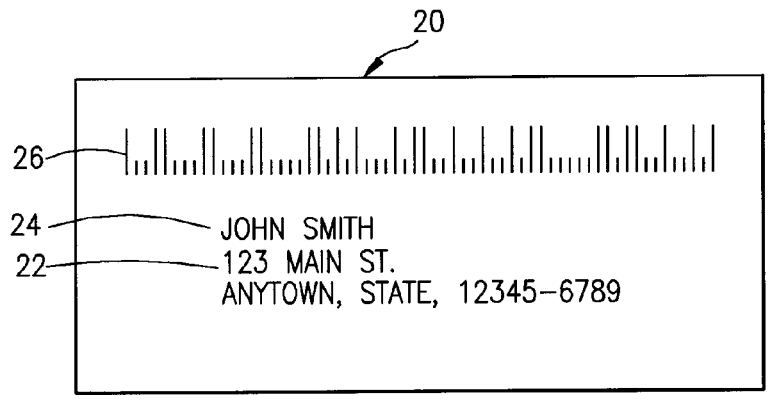
FIG. 2 is a plan view of a typical piece of addressed mail including a bar code.

Referring now to the drawings, and in particular FIGS. 1 and 2, the basic flow chart of the steps in the present invention of a system for bar code error detection on samples of bulk mail is shown generally at 10.

An address, including the name of the resident, is placed on a piece of mail 20, preferably using a print head. The data for the address and recipient name is located in a database within the system 10. In the preferred embodiment, a bar code 26 signifying the address is also placed on the mail piece. The bar code 26 preferably includes a five digit zip code, a plus four code, a two digit delivery point code, and a check digit to make the numbers in the entire bar code add up to a multiple of ten. However, the bar code may include additional information, such as an identifier for the intended recipient. Furthermore, reference throughout herein is made to USPS standards. However, any other printing and bar code standards may be used with this invention.

In FIG. 2, a mail piece 20, including the address 22, name of recipient 24 and bar code 26 are shown. Other information may also be included, if desired.

Following the flow chart in FIG. 1, an optical image is obtained of the address and bar code 30. Preferably the image is taken optically with a camera. To obtain a clear image of one of the moving pieces of mail at the desired sampling interval, a strobe light with a variable frequency is used with the optical reader.

Bar code data obtained from the bar code image of the mail piece is then verified against a database in the system 40. In the preferred embodiment, the image data is first compared to USPS physical specifications for a bar code 42, such as the length, thickness and separation of the lines. The image data is then compared to the USPS specifications for the address 44 placed on the mail piece. These specifications include size of the letters and legibility.

Also in the preferred embodiment, the bar code image is compared to the data to be printed on the mail piece 20 at the beginning of the process 10. This comparison provides a check on the accuracy and the legibility of the printing process independent of whether the USPS standards are met.

If the mail piece passed the verification tests, it is passed forward for processing 50, and the print job on the remaining bulk mail continues 80. However, if a mail piece does not comply with one or more of the standards, then the sample is rejected 60. The rejection may trigger an alarm 70, such as a light or siren. As shown in the flow chart 10, the rejection may also stop the print run altogether 70. Furthermore, it may be preferred that some leeway is allowed in the system for only a few rejections in the sample size. For example, the USPS allows a 10% rejection rate.

Once the print run is completed, and the verification tests are completed, the system preferably generates a report 90 verifying the accuracy of the print job. The report may be printed or shown on a monitor or graphical user interface. In the preferred embodiment, a printed report is generated to have written certification for the USPS that the print job meets the applicable standards.

Additional tests may be added, such as verification of the centering of the printed information, or other tests known in the printing or mailing industries. The invention may also be used internally by a governmental postal service as well as by a bulk mailer, as preferred.

Figure 3:
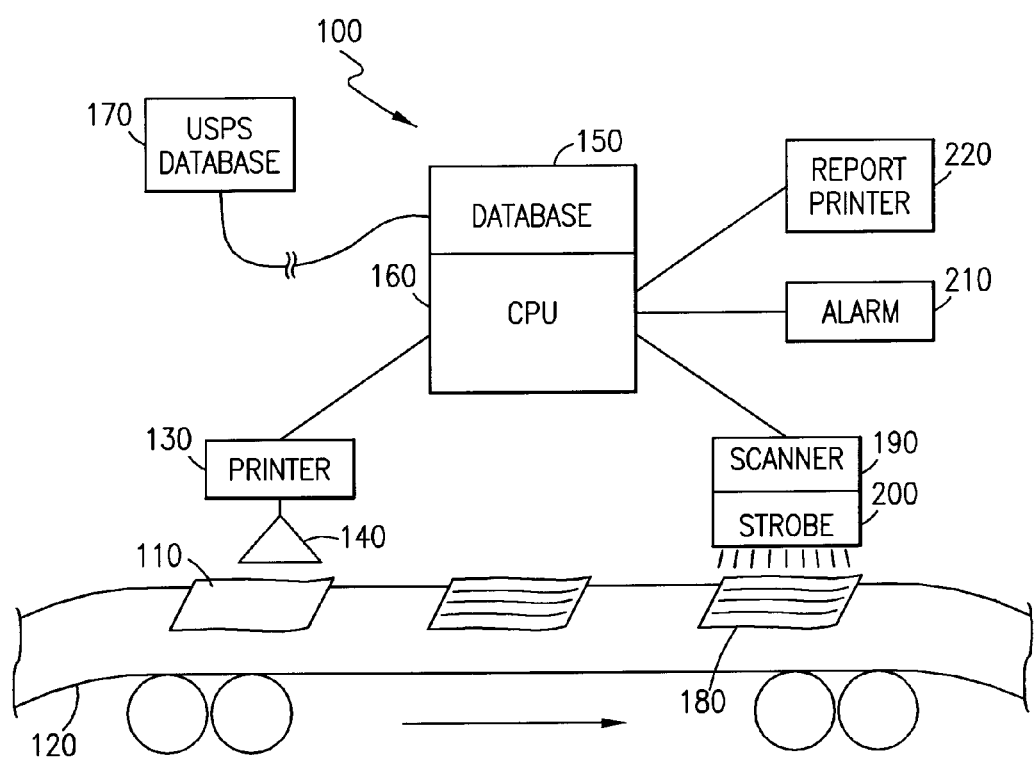
FIG. 3 is a schematic diagram of the system architecture of the preferred embodiment of the invention.

A schematic diagram of the invention showing the relationship of the component parts is shown at 100 in FIG. 3. In FIG. 3, the printer 130 using a printer head 140 addresses mail pieces 110 placed on a mail mover 120. The address and bar code information and the standards for the printing on the mail piece 110 are stored in a database 150 in electronic communication with a central processing unit 160. In one alternative embodiment, the database is in electronic communication with a second database 170 having data such as an updated USPS residency list.

The addressed mail piece 180 is then passed before an optical reader such as a camera 190 for obtaining an image of the printed bar code and address on the mail piece 180. In the preferred embodiment, a strobe light 200 is used in conjunction with a camera 190. The strobe light 200 is preferably one with a variable frequency, so the number of mail pieces sampled per print job may be varied. The data obtained from the image 180 is compared against the data and the standards in the database 150 in the CPU 160. Furthermore, the image obtained is compared to the data intended for that mail piece as it was sent to the printer 130. Thus, the accuracy of the mail piece data and the reliability of the printing are simultaneously verified.

If a mail piece or a predetermined number of mail pieces fails a verification test, an alarm 210 is preferably triggered. The alarm 210 may be audible, visual or both. In addition, the print job may be stopped, thereby stopping the printing and verification of a batch that has already failed in predetermined standards. After the print job is completed, or the print job fails, a report is generated in the CPU 160, and is preferably printed on a printer 220. The report may also be viewed on a monitor or graphical user interface. Furthermore, if the print job has failed for any reason, a report may be generated and printed describing the reason for the failure.

In one embodiment, the system only reads the bar code on the mail piece. The system then checks the print quality of the bar code and compares it with the USPS standards. The bar code is then decoded, and compared to a database in the computer to confirm that the bar code is valid. At the end of the print run, the system prints out a report to certify the sampling, comparison and error rate for the verification tests.

In another embodiment, the system reads both the bar code and the address on the mail piece. The system then checks the bar code and the address on the mail piece for print quality against the USPS standard. The system also decodes the bar code and compares it to the database in the computer to confirm its validity. Also, the data is confirmed to be that of a valid address. The system then prints out a report to certify the comparisons and the error rate for all of the verification tests.

In still another embodiment, the system reads the bar code and the address on the mail piece. The system then checks the bar code and the address for print quality compared to USPS standards. The system then decodes the bar code and compares the decoded bar code to the database in the computer The system also decodes the bar code and compares it to the database in the computer to confirm its validity. Also, the data is confirmed to be that of a valid address. In addition, the decoded bar code is compared to the USPS database to ensure that the address is accurate and that the recipient is the current resident at the address. The system then prints out a report to certify the sampling, comparisons and error rate for all verification tests.

Figure 4:
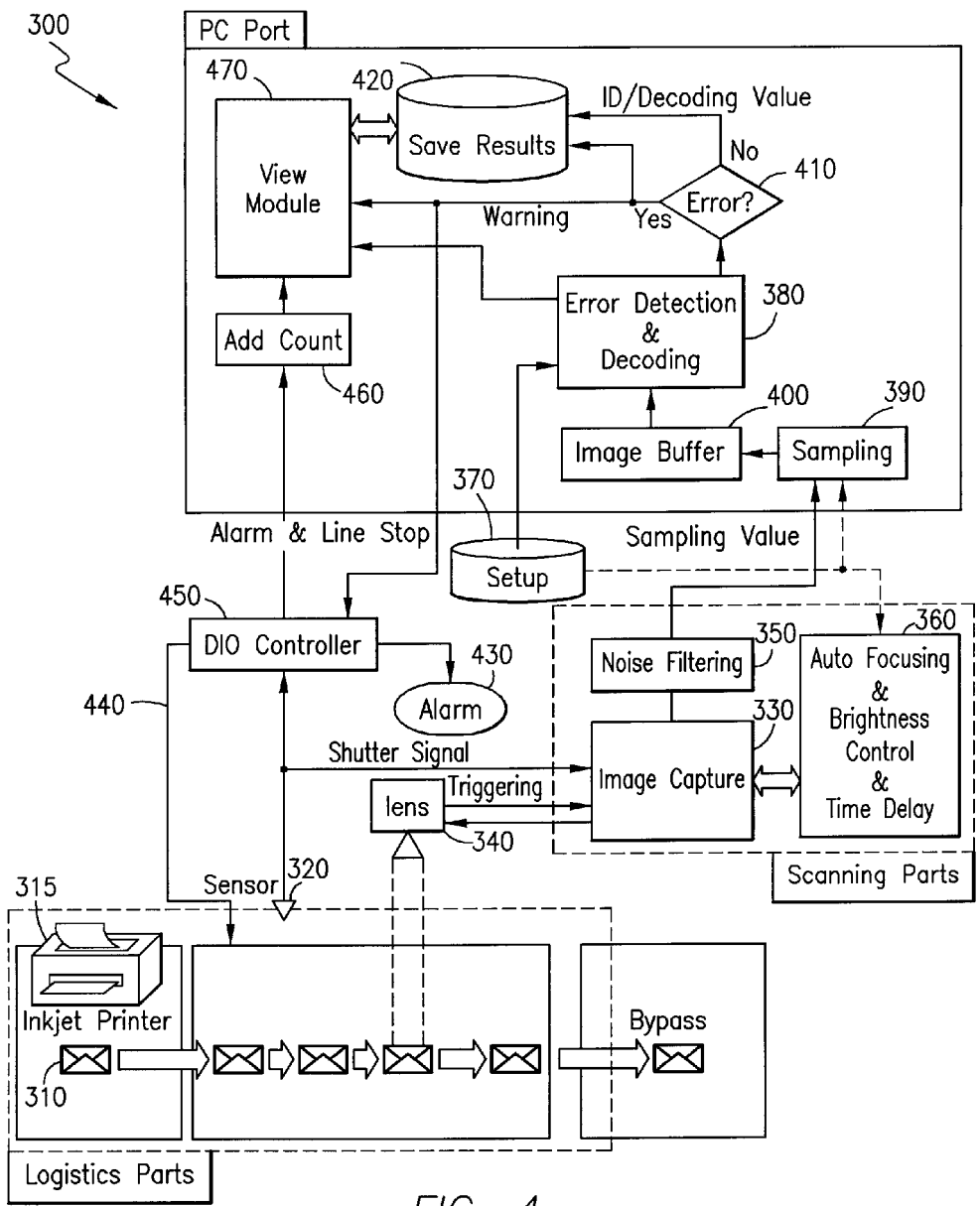
FIG. 4 is a schematic diagram of the system flow chart for an embodiment of the invention.

FIG. 4 details the system architecture. A printer 315 such as an ink jet printer prints the address and bar code for each mail piece 310. A sensor 320 detects a printed mail piece and signals the image capturing mechanism 330 via the discrete input/output controller 450. The image capturing mechanism 330, preferably using a lens 340, optically captures (in conjunction with the strobe light) the image of the address on the mail piece 310. In the preferred embodiment, the image capturing mechanism 330 works in conjunction with a noise filtering system 350 to clarify the image. The image capturing mechanism 330 also works with a focusing mechanism, brightness control and time delay mechanism 360. The time delay mechanism allows variable rates for image capture to accurately obtain the sample or to vary the rate of the sampling. Set-up information for the system 300 and the USPS standards are stored in a database 370.

As shown, the set up database 370 works in conjunction with the image capture mechanism 330 as well as the error detection and bar code decoding mechanism 380. The sampling 390 of the mail piece image is preferably placed in an image buffer 400. It is the image in this buffer 400 that is checked against the data in the set-up database 370. After error detection 410 on the image, the results of the error check are saved 420. If an error is found, in preferred embodiment an alarm 430 and line stop 440 are triggered.

A discreet input/output controller 450 is used to control an alarm 430, a line stop 440 and a mail piece counter 460. The counter 460 and the error detection and bar decoding report are then included in a viewable module 470 for the operator of the system. The viewable module can be a printed report or may be viewed on a screen.

The data in the set-up database 370 preferably includes information for the automatic focusing and brightness control for the image capture mechanism 330. In addition, it includes information for controlling the speed of the conveyor moving mail pieces. Also, it is preferred that the database includes information for the printing of the address on the mail piece, including print direction, bar code position, and sheet size. Furthermore, the size of the image capture is preferably included in the set up database 370.

Figure 5A:
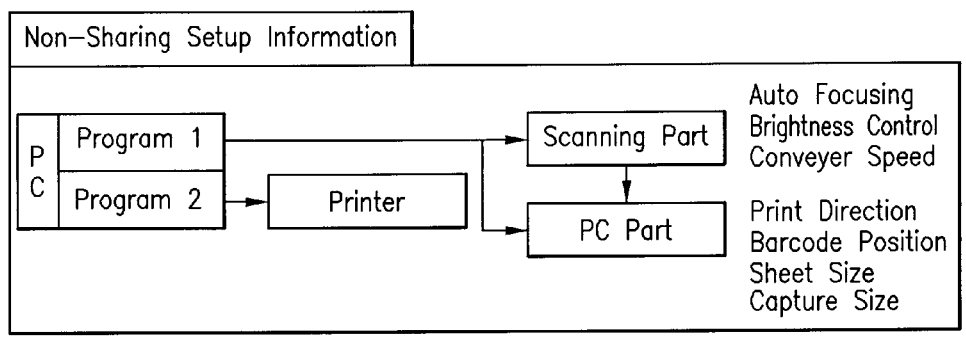
FIG. 5A is a schematic diagram of one embodiment of the set-up database of the invention.
Figure 5B:
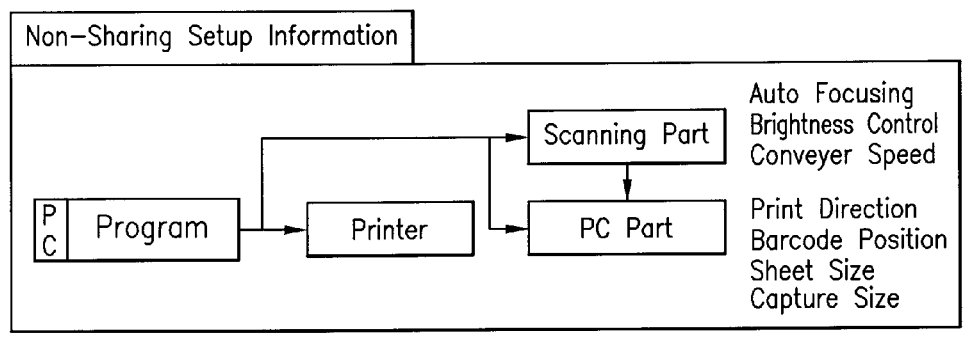
FIG. 5B is a schematic diagram of an alternative embodiment of the set-up database of the invention.

As shown in FIG. 5A, the set-up database may be in two discreet programs: one program for the optical reader and the conveyor control, and another for printer control. However, as shown in FIG. 5B, the information alternatively may be consolidated in one program. As a consolidated program, the information would be more readily available for comparison between the job as printed and the job as it was intended to be printed.

FIG. 6A shows a flowchart 500 for the image capture mechanism 330. As a mail piece passes through the system, the sensor 510 senses its presence. After the mail piece is sensed, the camera shutter and strobe light respond to the signal from the sensor. A delay 520 is calculated for the given conveyor speed to obtain a clear image of the given mail piece. A counter of mail pieces is then incremented 530. At a given interval, the captured image is counted as a sampling 540. The image of the sampling is then read 550 for error detection and bar code verification and decoding. The image capture system 500 is then reset for the next sensed letter.

In FIG. 6B, the error detection and bar code decoding mechanism is detailed at 600. As shown, the image obtained for error detection is first incrementally counted 610. Then, detection of error in the print job and decoding of the bar code is performed. If one or more errors are detected, the error is counted and recorded 630. At the detection of an error or a predetermined number of errors, an alarm is activated and the conveyor is stopped 640. Alternatively, as signal to the discreet input/output controller board may be made while the conveyor is kept moving. Next, an error report is compiled 650.

Detail of the saved results of the error verification testing 410 is detailed in FIG. 6C at 700. First, it is determined if there are any errors already waiting in storage 710. Then any new errors are received in the memory 720. The detected errors are saved in a report 730. Appropriate action is then taken, such as an alarm or line stop 740.

Figure 7:
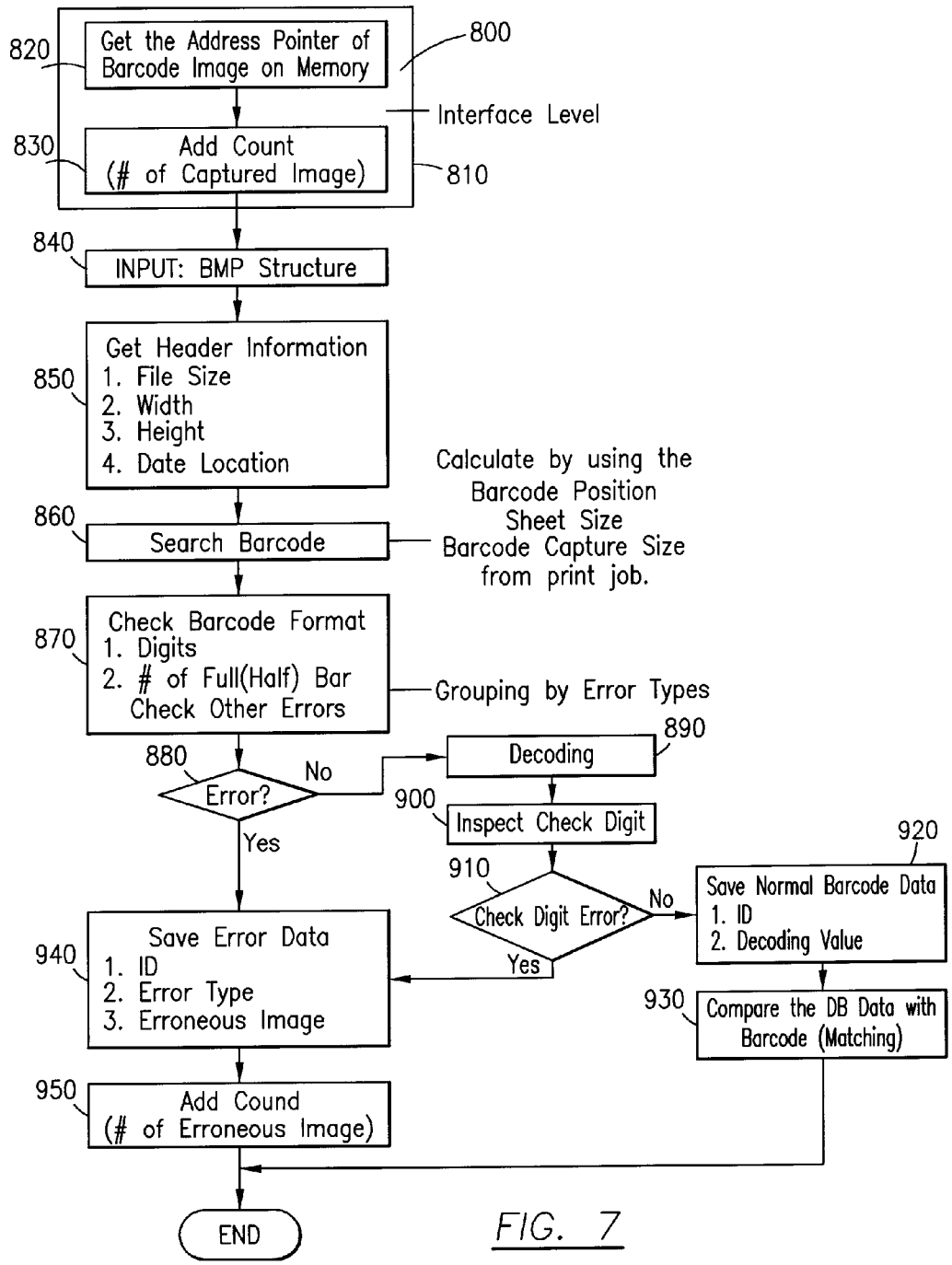
FIG. 7 is a flow chart of the error detecting and bar code decoding algorithm of the invention.

Detail of the error checking process is shown in FIG. 7 at 800. At the interface between the mail piece and the verification system 810, the system obtains the address pointer of the bar code image found in the set-up database 820. Once the image has been captured, the counter for the number of mail pieces is incremented 830. The error detection and decoding algorithm is then input 840. The algorithm is preferably in Bitmap file structure, having both header information and a data component. The header information includes file size, width of bar code, height of bar code and the data location 850. In the next step, the bar code on the mail piece is sought 860. The positioning can be calculated by using the bar code position, sheet size and bar code capture size information that was input from the print job.

Next, the bar code format is verified. Both the digit types and the number of full and half bars are confirmed to be proper for the USPS 870. Next, the absence of other potential errors is verified 880. For example, the length of the bar or half bar is checked. In the preferred embodiment, a full bar is 0.115 to 0.135 inches long, and a half bar is 0.040 to 0.060 inches long. Also, the width of each bar is checked. In the preferred embodiment, the width of each bar is 0.015 to 0.025 inches wide. In addition, the distance between the bars is also a standardized distance. In the preferred embodiment, the bar width is checked by pairs of bars.

The bar code is also checked for various types of other print errors. For example, the bar code position on the mail piece is required to be at a pre-determined location on the mail piece and a pre-determined distance from the address on the mail piece. Also, the presence of too much ink or too little ink is also checked. Furthermore, errors such as base line shift, a bar tilt or a pattern skew are also checked.

Next, the ability for the bar code to decode is verified 890. After the bar code is decoded, the check digit on the bar code is verified to have a proper check digit 900. In the preferred embodiment, the check digit is confirmed to make all of the digits in the bar code add up to a multiple of ten 910. If the check digit has no error, and no other error is found, the bar code data is preferably saved, the mail piece is given an identifier, and the decoded value of the bar code is saved 920. Also, in the preferred embodiment, the original database data is verified against the data obtained from the bar code 930.

If errors are found in the sampled mail piece, the error data is saved 940. The mail piece is identified, and the type of error is identified. In addition, an image of the mail piece containing the error may be saved. Next, the counter for the number of erroneous images obtained is incremented 950.

It is also contemplated that other errors in the address or bar code are tested. For example, errors may be found if the background reflectance of the printing is low, the print reflectivity difference is low, or the delivery point bar code is invalid.

Figure 8:
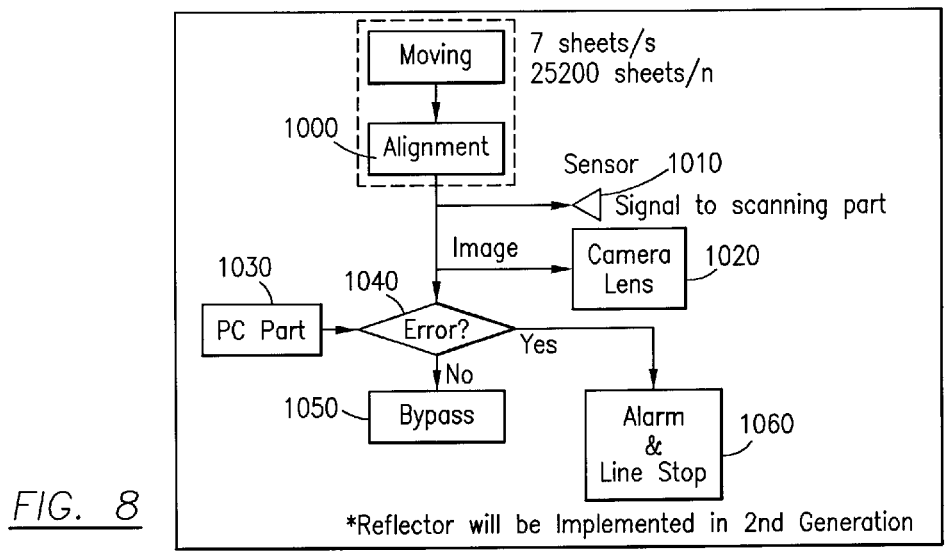
FIG. 8 is a flow chart of the part of the system that is physically moving mail pieces.

FIG. 8 is a detailed diagram of a portion of the system which physically moves the mail pieces. As shown, a mail piece is moved and aligned 1000. As an aligned mail piece moves before a sensor 1010, the sensor transmits a signal to the image obtaining mechanism. The image is obtained through a camera lens 1020. If an error is found by the portion of the system which verifies the address and bar code 1030, an error in the mail piece is then determined 1040. At that point, the mail piece is passed 1050. If an error is found, the alarm and line stop discussed above may be activated 1060.

Preferably, the mail pieces should move through the system at seven sheets per second. Furthermore, a guide rail is preferred for increasing the image capture accuracy. The mailings are bypassed or stopped in accordance with the mechanism for verifying the bar code and address through the use of a discreet input/output controller.

Figure 9:
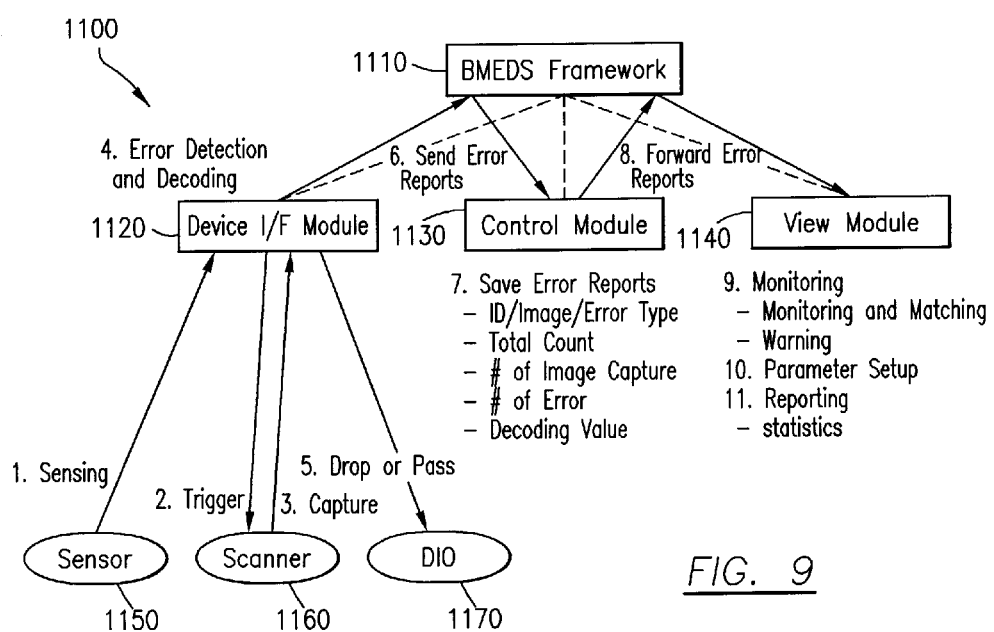
FIG. 9 is a schematic diagram illustrating the relationship of the software of the system.

FIG. 9 shows a diagram 1100 for the software used in system 1110. Three discreet, interrelated modules are illustrated: the device module 1120, the control module and the view module 1140. The device interface module 1120 works with a sensor 1150, a scanner 1160 and a discreet input/output controller 1170.

Figure 10:
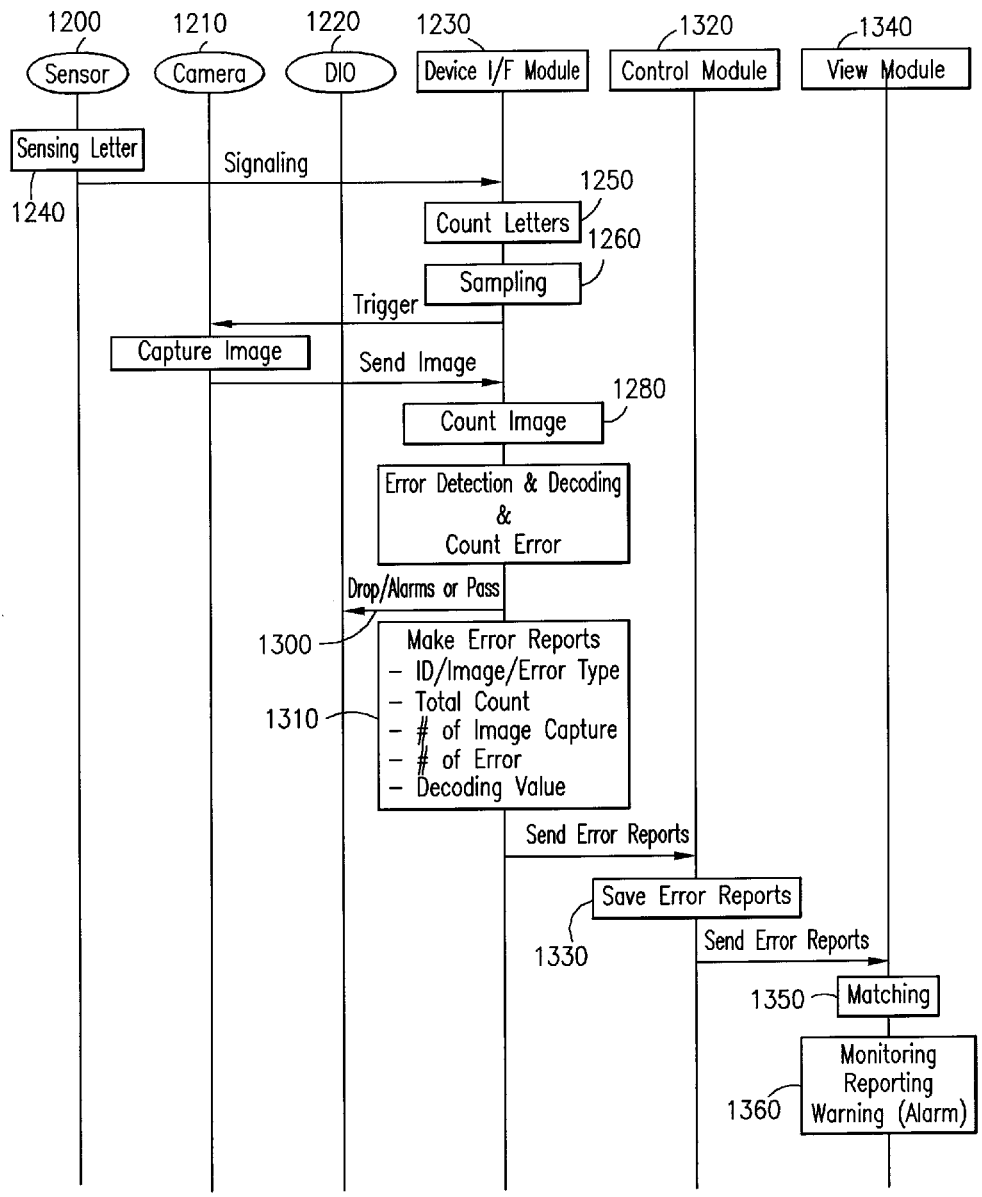
FIG. 10 is a sequential diagram of the software of the system.

The sequential diagram for the software is shown in FIG. 10. As shown, the sensor 1200, camera 1210, and discreet input/output controller 1220 are components of the device interface module 1230. Upon sensing the letter 1240, a signal is sent to the device interface module 1230 to count the letters 1250 and perform sampling 1260. Upon sampling 1260, an image of the sampled mail pieces captured 1270 and the image is returned to the device interface module 1230. A counter is incremented 1280 and error detection and bar code decoding are performed 1280. In addition, error counters are incremented. Upon finding an error or a threshold of errors, the mail itself may be taken out of the print set and/or an alarm is triggered 1300.

At the end of the sampling, the device interface module 1230 then makes error reports 1310. The error reports are transmitted to the control module 1320 where they are saved 1330. These error reports are preferably forwarded to the view module 1340. In the view module, error reports are matched with the mail pieces 1350. Also, monitoring of the system as it is being performed may take place 1360. Reports may be shown on a monitor or graphical user interface and a warning alarm, if required, may be triggered from a viewing station.

In the preferred embodiment, the camera or the image obtaining mechanism includes a camera such as the RTS-STC 1100 Progressive Scan CCD. Also, it is preferred that the lens obtaining the image is a 25 mm lens. It is also preferred to use a BANDIT2 MV FRAME image grabber, used in conjunction with an LED light with an LED light controller.

It is also preferred that the computer controlled portion of the system uses a central processing unit which is the equivalent of a Pentium 4 with a 1.8 GHz processor. It is preferred that there is more than 1 Gbyte of RAM, and a hard disk drive of more than 50 Gbytes. It is also preferred that the computer is network capable, i.e., has a local net area network card. Furthermore, it is preferred that the databases used in the system are in Microsoft Access or the equivalent. In addition, it is preferred to have a monitor and a printer for viewing and printing the results of error verification tests.

For the logistics of moving the mail pieces through the system, it is preferred to have a discreet input/output controller having OK/NG controls. In addition, the controller is preferred to have an alarm function, such as a warning light, and a line stop signal. In the preferred embodiment, the functions are made part of the firmware in a chip or board. A belt conveyor is preferred for moving the mail pieces themselves. It is also preferred to have a sensor and an associated power supply for detecting each of the mail pieces moving through the system. In addition, a bracket is preferred in proximity to the mail pieces as they move for the camera, light, and sensor. In addition, the warning light may also be placed on a bracket in proximity to the conveyor. Other equivalent hardware for the system is known is the art and contemplated for this invention.

By increasing the sampling accuracy while the bulk mailing is being printed, a report can be provided to the USPS by bulk mailers to speed up the bulk mailing process.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A high volume mailing error detection system for processing a mail piece, the mail piece having associated therewith mail piece bar code information, the system comprising:
    database with names, addresses and bar codes to be printed on mail pieces;
    printer connected to said database for printing a name, address and bar code on each mail piece during a print run of mail pieces;
    optical detector for obtaining an image of the mail piece information during said print run after printing the name, address and bar code on each mail piece;
    a mail piece mover for moving bulk mail including each mail piece through the system;
    said mail piece mover including a means for transporting each mail piece from said printer to said optical detector during said print run;
    means for comparing the bar code image printed on each mail piece during the print run with said database after each mail piece has been printed with a name, address and bar code for detecting bar code errors during the mail piece print run concerning the mail piece bar code information, wherein the mail piece information includes a bar code and the database comprises a data set of post office physical specifications, where the post office specifications include specifications regarding the legibility of bar codes;
    means for generating a sampling error report; and
    means for providing certification of the sampling comparisons and error rate for all functions base upon the sampling error report.

2. The system of claim 1, wherein said printer includes a printer head and the database comprises a data set of data sent to said printer head, wherein the printer head placed at least a portion of the mail piece information on the mail piece.

3. The system of claim 1, wherein the database further comprises an updated residency database.

4. A large volume error detection mailing system for sampling bar code errors in a piece of mail that prints the mail piece address while the print job is being processed, the mail piece having associated therewith mail piece bar code information, the system comprising:
- a database with names, addresses and bar codes to be printed on mail pieces during a mail piece print run;
- a printer connected to said database for printing a name, address and bar code on each mail piece during the print run;
- an optical image detector for capturing an image of the mail piece bar code information during the print run after each mail piece is printed;
- a bulk mail mover for moving the piece of mail from the printer to the optical image detector during the print run at least partway through the system;
- means for comparing the bar code image during the print run to said database after the name, address and bar code is printed on the mail piece, including:
  - data correlated to the bar code information on the piece of mail; and
  - data corresponding to post office bar code specifications for a piece of mail, where the post office specifications include specifications regarding the legibility of bar codes;
- means for generating a sampling error report; and
- means for certification of the sampling comparisons and error rate for all functions base upon the sampling error report.

5. A method for the in-house bar code error detection of a large volume of mail, comprising the steps of:
- providing a database with names, addresses and bar codes for printing on mail pieces and post office bar code specifications;
- printing a name, address, and bar code on each mail piece;
- obtaining bar code data associated with a piece of mail during a print run;
- performing an error detection check on the mail piece bar code data during the print run to find errors, where the step of performing an error detection check includes the additional steps of
  - comparing the optically captured image to said post office bar code specifications; and
  - comparing the optical bar code image to the bar code information intended to be printed on the piece of mail during the print nun after the name, address and bar code is printed on each mail piece;
- generating an error sampling report during the print run including an error rate relating to the step of performing bar code error detection check; and
- certifying the steps of comparing and the error rate based on the sampling report.

6. The method of claim 5, wherein the error detection report allows the user of the method to bypass at least a portion of the post office mail piece error detection methods.

7. The method of claim 5, wherein the step of obtaining data includes the step of optically obtaining an image of the address data.

8. The method of claim 5, further comprising the step of activating an alarm when the mail piece fails the error detection check during the print run to stop the print run.

9. The method of claim 5, further comprising the step of activating an alarm when inaccuracy of the information on a plurality of mail pieces reaches a predetermined number.

10. The method of claim 9, wherein the alarm is audible.

11. The method as in claim 5, including the step of:
- upon detecting an erroneous mail piece, stopping the print run, correcting the error and reprinting the correct information on a new mail piece.

12. A system for accurately reading an image and data associated with a piece of mail, during a print run while the mail piece address is being printed comprising:
- a computer having an original database for printing information on a piece of mail;
- a printer for printing the information on a piece of mail using the original database;
- a reader of an image of the information printed on the piece of mail during the print run;
- means for comparing the image obtained from the reader with the original database and/or a second database during the print run after printing said mail piece;
- means for generating a sampling error report during the print run; and
- certification of the sampling comparisons and error rate for all functions base upon the sampling error report.

13. The system of claim 12, wherein the second database includes post office physical specifications.

14. The system of claim 12, wherein the second database includes updated residency information from the post office.

15. The system of claim 12, further comprising a strobe light for illuminating the piece of mail for the reader.

16. The system of claim 15, wherein the strobe light has a variable frequency strobe.

17. The system of claim 12, wherein the second database includes address information obtained from the image of the address on the mail piece as printed during the print run.

* * * * *